Figure 1:
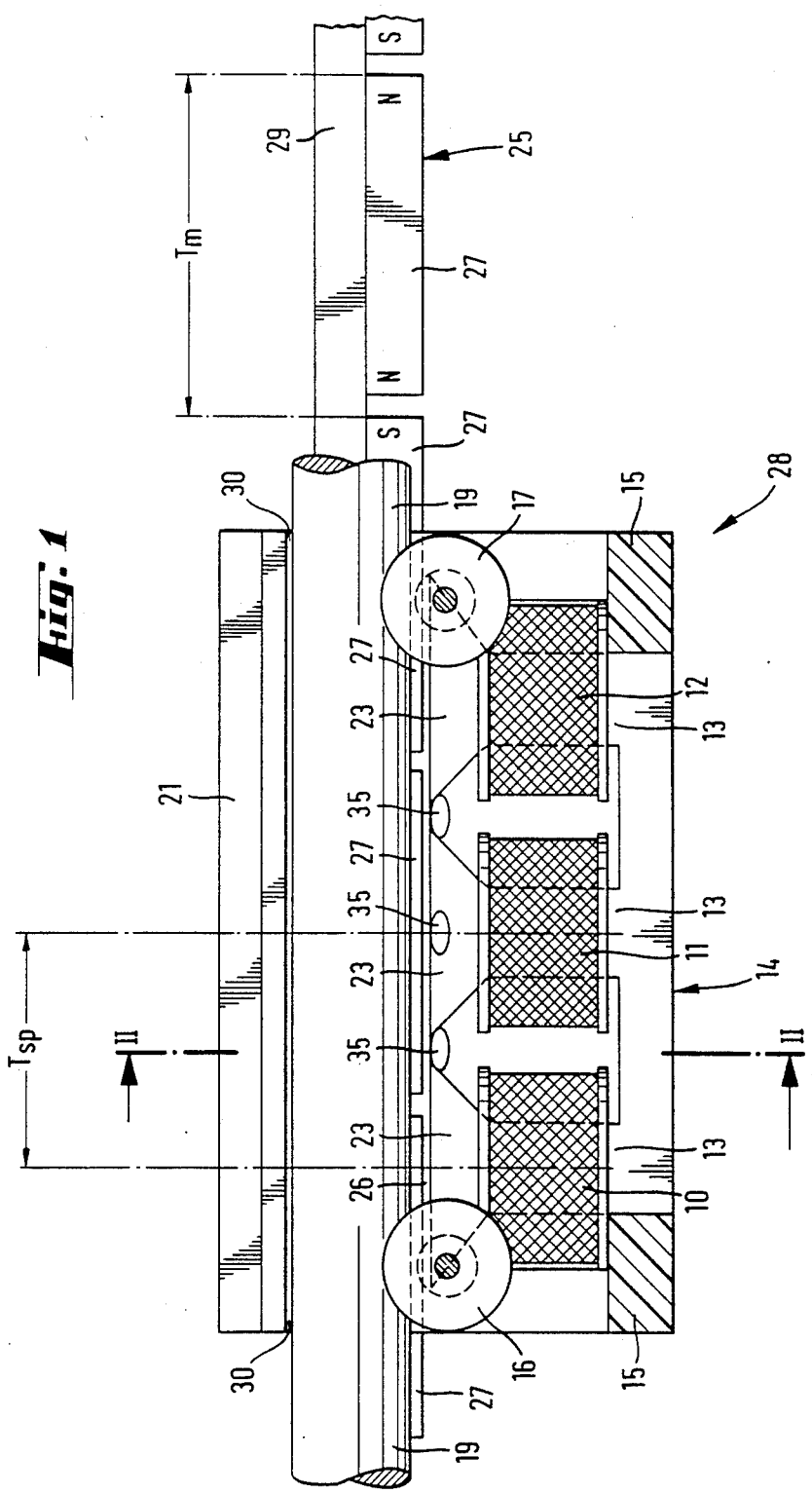

United States Patent [19]

von der Heide

[11] Patent Number: 4,633,108

[45] Date of Patent: Dec. 30, 1986

[54] DIRECT CURRENT LINEAR MOTOR

[75] Inventor: Johann von der Heide, Mönchweiler, Fed. Rep. of Germany

[73] Assignee: Papst-Motoren GmbH & Co. KG, St. Georgen, Fed. Rep. of Germany

[21] Appl. No.: 757,919

[22] Filed: Jul. 22, 1985

Related U.S. Application Data

[63] Continuation of Ser. No. 583,094, Feb. 23, 1984, abandoned, which is a continuation of Ser. No. 272,922, Jun. 12, 1981, abandoned.

[30] Foreign Application Priority Data

Jun. 12, 1980 [CH] Switzerland ..................... 4519/80

[51] Int. Cl.$^4$ ............................................. H02K 41/00
[52] U.S. Cl. ...................................... 310/12; 318/135
[58] Field of Search .................... 310/12–19; 318/135

[56] References Cited

U.S. PATENT DOCUMENTS 3,707,924  1/1973  Barthalon ..................... 310/12 X
4,151,447  4/1979  van der Heide ................... 318/135

OTHER PUBLICATIONS

*IBM Tech. Disclosure Bulletin,* "Linear Incremental Motor," Thompson, vol. 6, #9, 2/64.

*Primary Examiner*—Donovan F. Duggan
*Attorney, Agent, or Firm*—Fitch, Even, Tabin & Flannery

[57] ABSTRACT

A direct current linear motor, particularly for use in data processing drive systems, is provided. The motor includes a plurality of permanent magnet poles disposed linearly adjacent each other, a ferromagnetic structure having a multi-strand winding formed of a plurality of coils, each strand forming a coil, the permanent magnet poles and the ferromagnetic structure being linearly moveable relative to each other. A flat air gap is defined between and separates the permanent magnet poles and the ferromatic structure. The ratio of the coil pitch of the ferromatic structure to the magnetic poles of the permanent magnet system is not greater than 1.

12 Claims, 4 Drawing Figures

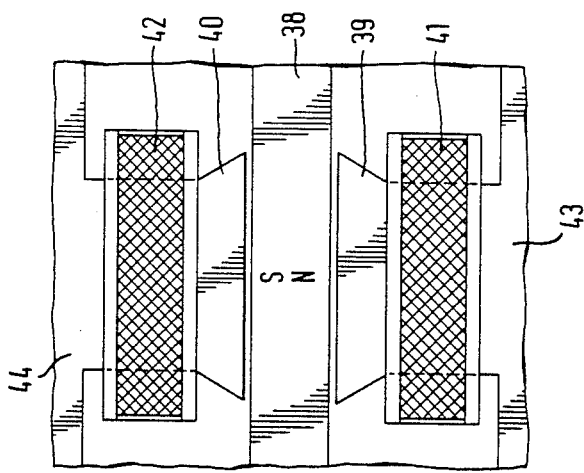
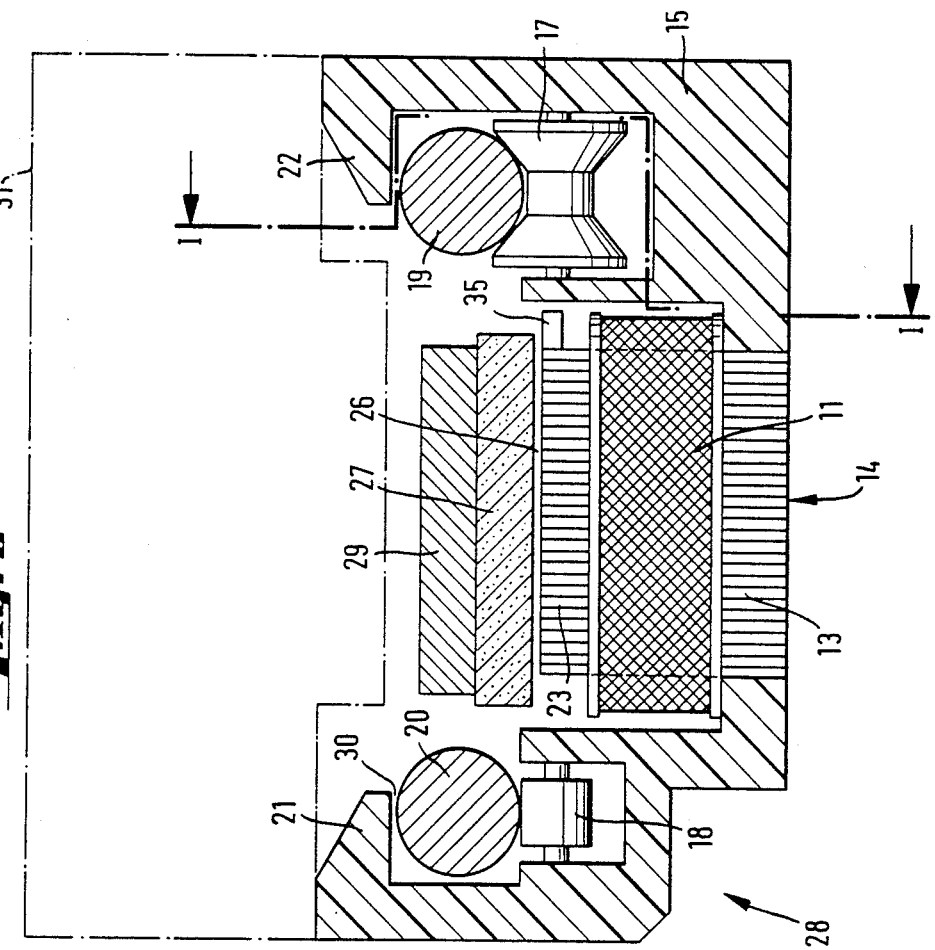

DIRECT CURRENT LINEAR MOTOR

This application is a continuation of application Ser. No. 583,094 filed Feb. 23, 1984, now abandoned which in turn is a continuation of Ser. No. 272,922 filed June 12, 1981 now abandoned.

The invention relates to a direct current linear motor having a permanent magnetic system with a ferromagnetic flux return path or structure and a multi-phase winding, movable in mutual relationship, the winding consisting of a plurality of coils, aligned in the direction of movement and being energized in cyclic sequence, particularly for drive systems in the data processing industry.

In heretofore known motors of this kind (U.S. Pat. No. 4,151,447) there is provided on the inner side of at least one of two parallel, ferromagnetic bars a series of magnets that are alternately magnetized in a direction transverse to the length of the bars. A coil system energized by current and movable relative to the bars comprises at least two flat coils disposed in offset relationship to each other in the longitudinal direction between one series of magnets and the other bar or between the magnet series of both bars, the broad sides or faces of the coils lying parallel to the direction of movement of the coils, the ratio of the pitch of the three-conductor motor to the pitch of the magnets being 4:3. The air gap in the known application necessarily has a relatively large dimension, a fact undesirable in respect of the output power of the motor.

A special object of the invention is to provide a linear motor which combines simplicity of construction with high output power.

Starting with a linear motor of the kind described at the outset, the invention provides a solution of the object in that each of the coils surrounds a pole of at least one slotted flux carrying member, which together with the permanent magnetic system, forms a substantially plane air gap, e.g. in the form of a sheet iron stack of solid iron or sintered iron, with vertically upstanding axis of the coil, and without overlap, the ratio of the coil pitch to the magnet pitch being 2:3.

The direct current linear motor of the invention can be constructed with a small air gap. At the same time the motor is of particularly simple construction.

The poles of the flux guide member can be substantially T-shaped in order effectively to guide the magnetic flux. The width of the magnet pole in the direction of movement for convenience can be at least equal to the dimension of the coil pitch. The winding is preferably a three-conductor or three independent-coil type winding.

In the first embodiment of the invention the magnetic system is stationary; the armature can have three poles aligned in the direction of movement, each carrying a coil. In such an embodiment, at least two armature flux carrying members with the corresponding coils are disposed symmetrically on the opposite sides of the magnetic system. But there can be also provided one armature guide member only, which is arranged relative to the magnetic system and a load associated with the armature so that the point of gravity of the armature and the load combined is closer to the air gap and/or the armature guide path than the point of gravity of the load alone and the point of gravity of the rotor alone. This is of particular advantage, for it provides a quiet, wear-free movement of the armature.

According to another modified embodiment, the magnetic system can be a part of the armature. A guide bar can be provided on each side of the armature, and the armature is supported thereon by a three-point support. This support can preferably comprise two double conical rollers spaced longitudinally of movement of the armature and cooperating with the other guide bar. This kind of support insures a statically stable bearing even with normal dimensional tolerances. Magnetic attraction can be taken advantage of for guiding. The rollers can be rotatably supported in a frame, which on the side of the guide bars facing away from the rollers carries a limit device, e.g. lugs extending beyond the guide bars.

The motor can be constructed without a collector as a brushless mortar, and there can be provided an electric commutation device to energize the coils in cyclic sequence in accordance with the position of the armature. If in such case the alternating poles of the permanent magnetic system are joined more or less without gap along the line of movement of the armature, the commutation device can be equipped with armature sensors responsive to the magnetic field and located in the direct field of the permanent magnetic system, e.g. Hall generators, field plates, magnet diodes, or bistably switching Hall ICs. But basically there also can be provided optical or mechanical commutation sensors. For example, commutation in a stationary magnetic system can take place via guide segments disposed parallel to the pitch of the magnets and three brushes located in the pitch of the coils to thus constitute a linear collector motor.

An embodiment with a stationary magnetic system provides the advantage of a minimal coil resistance, combined with an exceptionally easy assembly of the coils. Only three sensors of the magnetic field are necessary. In working with a stationary winding, a very light armature is necessary, which, apart from the necessary guide means, consists only of magnets and ferromagnetic flux return structure.

Figure 4:
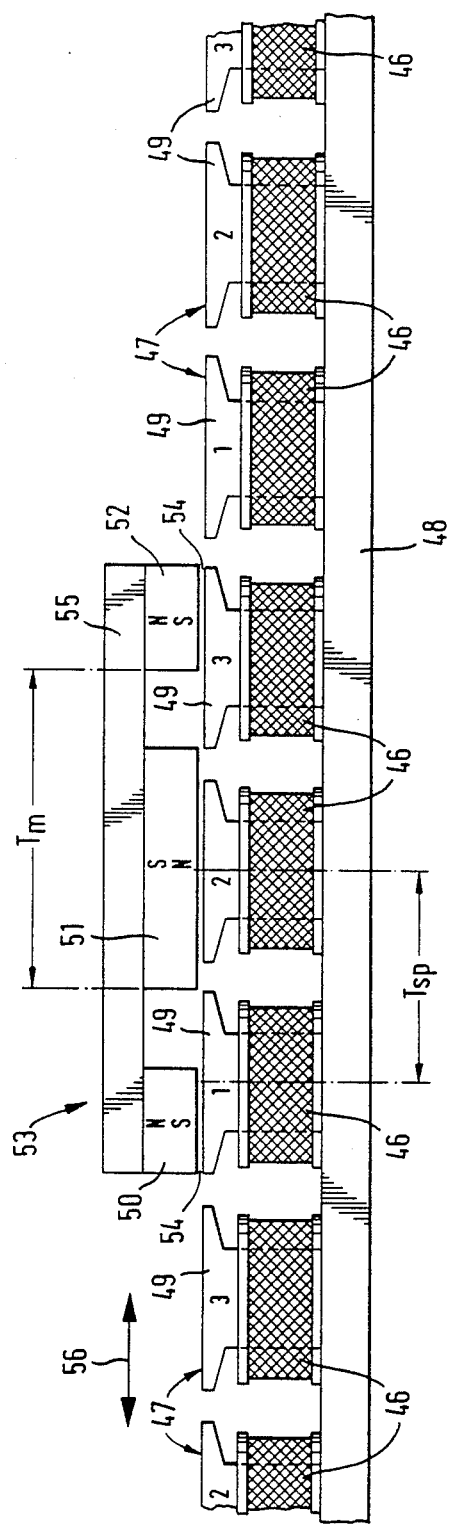

The invention will be now described on the basis of the preferred embodiments illustrated by the accompanying drawings, wherein:

FIG. 1 is a partial cross-section of a direct current linear motor along line I—I of FIG. 2, FIG. 2 is a diagrammatic cross-section of the motor along line II—II of FIG. 1, FIG. 3 is a diagram of a modified embodiment of symmetrical construction, and FIG. 4 is a diagrammatical side view of another modified embodiment with stationary winding.

The linear motor shown in FIGS. 1 and 2 is a three-phase motor. The three winding phases are provided each in coils 10, 11, 12, without overlap, surrounding a T-shaped pole 13 of a slotted flux carrying member 14, which in the illustrated embodiment is an iron lamination stack. The iron lamination stack 14 is held in a frame 15 of, for example, glass reinforced plastic, in which are supported two double conical rollers 16, 17 and a cylindrical roller 18. The double conical rollers 16, 17 cooperate with a guide bar 19, while the cylindrical roller 18 is associated with a guide bar 20. Safety lugs 21, 22 extend beyond the guide bars 19, 20 on the sides facing away from rollers 16, 17, 18 and constitute safety means against falling. Pole shoes 23 of the poles, together with a magnetic system 25, define a plane air gap 26. The magnetic system 25 comprises a sequence of magnetic plates 27, which are alternately magnetized in a direction extending perpendicularly to the direction of movement of an armature 28 mainly consisting of the iron lamination stack 14, coils 10 to 12 and frame 15.

The coil pitch in FIG. 1 is designated as $T_{sp}$ and the magnetic pitch as $T_m$. These pitches are in a ratio of 2:3. The magnetization is substantially triangular or trapezoidal. The width of the permanent magnet pole should at least correspond to the coil pitch $T_{sp}$. A ferromagnetic flux return structure 29 is positioned over the magnet plates 27. Also, a correspondingly alternately magnetized magnetic strip (not shown in the drawings) can be provided instead of the individual magnetic plates 27.

Rollers 16, 17, 18 abut the guide bars 19 or 20 by magnetic attraction. Safety lugs 21, 22 protect the armature 28 from falling. In this connection, the safety lugs 21, 22, together with the guide bars 19, 20 provide a slide gap 30, e.g. 0.3 mm wide. A load 31 connected to the armature 28, e.g. a printing head of a data printer, is indicated in FIG. 2. In the asymmetrical construction of the motor of FIGS. 1 and 2 the point of gravity of the combination of rotor 28 and load 31 is closer to abut the rotor guide path provided by the guide bars 19, 20 than the point of gravity of the load 31 alone and the point of gravity of the rotor 28 alone. The result is a particularly quiet movement of rotor 28, without wear.

Plastic-bound magnets or so-called rubber magnets, i.e. mixtures of hard ferrites and flexible material, are particularly suitable for the magnetic system 25. But ceramic magnets or magnets of samarium cobalt also can be provided.

A known per se (not shown in the drawings) electronic commutation device (cf. e.g. U.S. Pat. No. 4,151,447) can be provided for energizing coils 10, 11, 12. Hall generators, Hall-ICs, field plates, magnetic diodes and the like are suitable as responsive to magnetic field sensors 35 of the rotor position; they are located directly in the field of the magnetic system 25. Corresponding magnetic field sensors are illustrated in FIGS. 1 and 2 as rotor position sensors.

FIG. 3 diagrammatically shows a symmetrical construction, where a flux carrying member 39 or 40 is located on each side of the magnetic system, corresponding to the flux carrying member 14, with a group of coils 41 or 42 and a lamination stack 43 or 44.

If desired, the flux carrying member 14 can be also equipped with more than three poles. It is expedient to work, e.g. with six poles, which carry a total of six coils, every two coils providing one of the three winding phases.

The winding of the modified embodiment of FIG. 4 is stationary. This winding has three phases, namely 1, 2, 3. Spools 46 are laid, without overlap, around each pole 47 of the flux carrying member, e.g. iron lamination stack 48. Poles 47 are substantially T-shaped. Their pole shoes 49, together with magnets 50, 51, 52 of a rotor 53 or a carriage, constitute a plane air gap 54. Rotor 53 also comprises a ferromagnetic flux return structure 55. Suitable guide means, not shown in the drawing, is associated with rotor 53 to permit the movement of the rotor 53 in the direction of an arrow 56 and contrary to its direction when coils 46 are energized in corresponding sequence by a suitable commutation device (not shown in the drawings).

The motor can be constructed as a collector motor. But it can be also constructed as a brushless motor. Its coils 10, 11, 12, 41, 42, 46 are energized in cyclic sequence by the electronic commutation device depending on the position of the rotor.

What I claim is:

1. A brushless direct current linear motor, particularly for use in data processing drive systems, said motor having a stationary portion and an armature and comprising:
    a permanent magnetic system formed of a plurality of permanent magnet poles disposed linearly adjacent each other and being alternately magnetized;
    a ferromagnetic structure formed of at least one slotted flux-carrying member and a plurality of coils connected into a three independent-coil type winding, the coils disposed linearly adjacent each other on the flux-carrying member, the coils being energized in cyclic sequence and each said coil separately surrounding a substantially T-shaped pole of the at least one flux-carrying member between adjacent slots thereof; and
    a flat air gap defined between and separating said permanent magnetic system and said ferromagnetic structure;
    the ratio of the coil pitch of said ferromagnetic structure to the magnetic pitch of the permanent magnetic system being 2:3 irrespective of the number of coils;
    said permanent magnetic system and said ferromagnetic structure being linearly moveable relative to each other in their longitudinal direction, the axis of each said coil of said ferromagnetic structure extending perpendicular to the direction of relative movement and the permanent magnet poles being alternately magnetized in a direction perpendicular to the direction of relative movement.

2. A motor according to claim 1 wherein the permanent magnetic system is stationary and the ferromagnetic structure is the armature and has at least three poles aligned adjacent each other in the direction of linear movement, each pole including a coil.

3. A motor according to claim 2, wherein at least two flux guide members with associated coils are symmetrically located on the opposite sides of the permanent magnetic system.

4. A motor according to claim 1 wherein the permanent magnetic system is the armature and the ferromagnetic structure is stationary.

5. A motor according to claim 2, wherein on each side of the armature a guide bar is provided, the armature being supported thereon by a three-point support.

6. A motor according to claim 4 wherein on each side of the armature there is provided a guide bar, the armature being supported thereon by a three-point support.

7. A motor according to claim 5, wherein the three-point support comprises two double conical rollers spaced in the direction of movement of the armature in contact with one guide bar and a cylindrical roller in contact with the other guide bar.

8. A motor according to claim 7, wherein the rollers are rotatably supported in a frame, said frame carrying fall safety means, particularly in the form of safety lugs.

9. A motor according to claim 8, wherein the frame comprises guide bars on the side facing away from the rollers.

10. The motor according to claim 1, further comprising armature position sensors responsive to the magnetic field and located in the direct field of the permanent magnetic system.

11. A motor according to claim 1, wherein at least two flux-carrying members with associated coils are symmetrically located on the opposite sides of the permanent magnetic system.

12. A motor according to claim 1 wherein the armature includes only a single slotted flux-carrying member having the coils disposed thereon, said single flux-carrying member and coils being located on one side of the permanent magnetic system and being connected to a load, said armature being arranged relative to the permanent magnetic system such that the resultant point of gravity of the combined armature and load approximately coincides with the position of the flat air gap.

* * * * *